United States Patent
Numata et al.

(10) Patent No.: US 12,370,724 B2
(45) Date of Patent: Jul. 29, 2025

(54) METHOD OF RECYCLING CARBON FIBER

(71) Applicant: TOYOTA JIDOSHA KABUSHIKI KAISHA, Toyota (JP)

(72) Inventors: Yusuke Numata, Toyota (JP); Hiroyuki Ishii, Toyota (JP); Akira Kano, Toyota (JP); Shinichiroh Hirayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 650 days.

(21) Appl. No.: 17/664,547

(22) Filed: May 23, 2022

(65) Prior Publication Data

US 2022/0371226 A1 Nov. 24, 2022

(30) Foreign Application Priority Data

May 24, 2021 (JP) ................................ 2021-086682

(51) Int. Cl.
 *B29B 17/02* (2006.01)
(52) U.S. Cl.
 CPC .... *B29B 17/021* (2013.01); *B29B 2017/0293* (2013.01)
(58) Field of Classification Search
 USPC .......................................................... 521/40
 See application file for complete search history.

(56) References Cited

U.S. PATENT DOCUMENTS

| | | | |
|---|---|---|---|
| 10,167,378 B2 | 1/2019 | Urayama | |
| 10,343,305 B2 | 7/2019 | Kano | |
| 10,829,611 B1 | 11/2020 | Maxey | |
| 2010/0267868 A1 | 10/2010 | Takahashi | |
| 2015/0284541 A1 | 10/2015 | Urayama | |
| 2017/0157801 A1 | 6/2017 | Yang et al. | |
| 2019/0099921 A1 | 4/2019 | Kano | |
| 2019/0240871 A1 | 8/2019 | Janssen | |
| 2020/0079918 A1 | 3/2020 | Toyoshima et al. | |
| 2022/0010463 A1 | 1/2022 | Watanabe et al. | |

FOREIGN PATENT DOCUMENTS

| | | | |
|---|---|---|---|
| CN | 108912389 A | | 11/2018 |
| CN | 110678507 A | | 1/2020 |
| DE | 10 2016 117 559 A1 | | 3/2018 |
| EP | 3626769 A1 | | 3/2020 |
| JP | 2001347523 A | | 12/2001 |
| JP | 2005255835 A | | 9/2005 |
| JP | 2008013614 A | | 1/2008 |
| JP | 2015000897 A | | 1/2015 |
| JP | 2015199827 A | | 11/2015 |
| JP | 2017104847 A | | 6/2017 |
| JP | 2018172609 A | * | 11/2018 |
| JP | 2019529177 A | | 10/2019 |
| JP | 2020037638 A | | 3/2020 |
| JP | 2020050704 A | | 4/2020 |
| JP | 2022015366 A | | 1/2022 |
| WO | 2018212016 A1 | | 11/2018 |

OTHER PUBLICATIONS

JP-2018172609-A Machine Translation (Year: 2018).*
Hiroshi Urayama, U.S. Appl. No. 17/502,459, Non-Final Office Action dated Aug. 23, 2024.
Hirofumi Nishida, Journal Vol. of the Japanese Society of Adhesion 51 No. 12 (2015), "The Development of Thermoplastic Epoxy Resin and Continuous Fiber Reinforced Thermoplastics using it", including English machine translation.

* cited by examiner

*Primary Examiner* — Terressa Boykin
(74) *Attorney, Agent, or Firm* — Dickinson Wright, PLLC

(57) ABSTRACT

Provided is a method of recycling carbon fibers that allows obtaining continuous carbon fibers. The present embodiment is a method of recycling carbon fibers that includes preparing a carbon fiber reinforced plastic molded product including carbon fiber reinforced plastic containing carbon fibers and a resin and drawing the carbon fiber reinforced plastic while performing a heating treatment on the carbon fiber reinforced plastic molded product. A temperature of the heating treatment is equal to or above a glass-transition temperature of the resin and below a thermal decomposition start temperature, and the temperature is below a thermal degradation temperature of the carbon fibers.

11 Claims, 12 Drawing Sheets

METHOD OF RECYCLING CARBON FIBER

CROSS REFERENCE TO RELATED APPLICATIONS

The present application claims priority from Japanese patent application JP 2021-086682 filed on May 24, 2021, the entire content of which is hereby incorporated by reference into this application.

BACKGROUND

Technical Field

The present disclosure relates to a method of recycling carbon fibers.

Background Art

Carbon fiber reinforced plastic (CFRP) is a material that is lightweight, highly rigid, and capable of withstanding high pressure hydrogen. Therefore, it is used for carbon fiber reinforced plastic molded products, such as a hydrogen tank of a fuel cell vehicle. Furthermore, carbon fiber reinforced plastic molded products are used in a wide field besides a tank, such as for sports and recreational products, and aerospace component parts. However, carbon fibers contained in the carbon fiber reinforced plastic are expensive, and moreover, emit a large amount of $CO_2$ during manufacture and have a difficult disposal process, which cause a heavy burden on the environment. Therefore, a method of collecting and recycling the carbon fibers from used carbon fiber reinforced plastic molded products is being examined.

For example, WO 2018/212016 discloses a method of obtaining carbon fiber substrates as recycled carbon fiber bundles from a carbon fiber reinforced plastic containing a plurality of carbon fiber substrates and a matrix resin, which is a manufacturing method of the recycled carbon fiber bundle, in which the carbon fiber reinforced plastic is heated to thermally decompose the matrix resin to obtain a heat-treated product, and the heat-treated product is cracked to separate the plurality of carbon fiber substrates.

SUMMARY

As disclosed in WO 2018/212016, a method of collecting carbon fibers from carbon fiber reinforced plastic molded products is being examined. However, in WO 2018/212016, since a step of crushing the matrix resin is proposed, continuous carbon fibers cannot be obtained. Therefore, carbon fibers reusable for molded products that require continuous carbon fibers cannot be obtained.

Furthermore, in WO 2018/212016, the carbon fiber reinforced plastic is heated at high temperature to thermally decompose the matrix resin. However, the high temperature heating may possibly degrade the carbon fibers and reduce their strength. Furthermore, by heating the carbon fiber reinforced plastic at high temperature, properties of the resin, such as solubility, may possibly change and cause difficulty to remove the resin in a post-process.

Furthermore, WO 2018/212016 proposes obtaining the carbon fibers by removing the matrix resin. However, by suppressing degradation of the matrix resin and taking out the carbon fiber reinforced plastic, it is considered possible to reuse the carbon fiber reinforced plastic without removing the matrix resin.

The present embodiment has been made in consideration of any one of the problems described above. For example, the embodiment provides a method of recycling carbon fibers that can obtain continuous carbon fibers. Furthermore, for example, the embodiment provides a method of recycling carbon fibers that can obtain continuous carbon fibers while suppressing degradation of the carbon fibers. Furthermore, for example, the embodiment provides a method of recycling carbon fibers that can obtain a carbon fiber reinforced plastic while suppressing degradation of the carbon fibers. Furthermore, for example, the embodiment provides a method of recycling carbon fibers that can obtain a carbon fiber reinforced plastic while suppressing degradation of a resin. Furthermore, for example, the embodiment provides a method of recycling carbon fibers that can obtain a carbon fiber reinforced plastic while suppressing degradation of the carbon fibers and the resin.

One aspect of the present embodiment is as follows.

(1) A method of recycling carbon fibers comprising:
preparing a carbon fiber reinforced plastic molded product including a carbon fiber reinforced plastic containing carbon fibers and a resin; and
drawing the carbon fiber reinforced plastic while performing a heating treatment on the carbon fiber reinforced plastic molded product,
wherein a temperature of the heating treatment is equal to or above a glass-transition temperature of the resin and below a thermal decomposition start temperature, and the temperature is below a thermal degradation temperature of the carbon fibers.

(2) The method according to (1),
wherein the thermal decomposition start temperature of the resin is a temperature indicating a 5% weight loss in a weight change chart of a thermogravimetric analysis obtained by raising the temperature of the resin from 30° C. to 550° C. by 5° C./minute under a nitrogen atmosphere.

(3) The method according to (1),
wherein the thermal decomposition start temperature of the resin is a temperature indicating a 5% weight loss in a weight change chart of a thermogravimetric analysis obtained by raising the temperature of the resin from 30° C. to 550° C. by 5° C./minute under an air atmosphere.

(4) The method according to any one of (1) to (3),
wherein the temperature of the heating treatment is below 400° C.

(5) The method according to any one of (1) to (4),
wherein the temperature of the heating treatment is equal to or below 360° C.

(6) The method according to any one of (1) to (5), further comprising
removing the resin in the drawn carbon fiber reinforced plastic.

(7) The method according to (6),
wherein the removing the resin includes bringing a dissolution liquid into contact with the carbon fiber reinforced plastic.

(8) The method according to (7),
wherein the dissolution liquid contains at least one liquid selected from an acidic solution, an organic solvent, an aqueous hydrogen peroxide, or an ionic liquid.

(9) The method according to (7) or (8),
wherein the dissolution liquid is an acidic solution.

(10) The method according to any one of (6) to (9), further comprising
winding the carbon fibers that are removed of the resin.

(11) The method according to (10), further comprising:
drawing the carbon fiber reinforced plastic while performing the heating treatment;
removing the resin in the carbon fiber reinforced plastic that is drawn and conveyed; and
winding the carbon fibers that are removed of the resin,
wherein the carbon fiber reinforced plastic is drawn in the upper stream, while the carbon fibers are wound in the downstream.

(12) The method according to any one of (1) to (5), further comprising
cutting the drawn carbon fiber reinforced plastic.

(13) The method according to any one of (1) to (12),
wherein the heating treatment is performed using superheated steam.

(14) The method according to any one of (1) to (13),
wherein the resin comprises a thermosetting resin or a thermoplastic resin.

(15) The method according to any one of (1) to (14),
wherein the resin comprises an epoxy resin.

According to one aspect of the present embodiment, for example, a method of recycling carbon fibers that can obtain continuous carbon fibers can be provided. Furthermore, according to one aspect of the present embodiment, for example, a method of recycling carbon fibers that can obtain continuous carbon fibers while suppressing degradation of the carbon fibers can be provided. Furthermore, according to one aspect of the present embodiment, for example, a method of recycling carbon fibers that can obtain a carbon fiber reinforced plastic while suppressing degradation of the carbon fibers can be obtained. Furthermore, according to one aspect of the present embodiment, for example, a method of recycling carbon fibers that can obtain a carbon fiber reinforced plastic while suppressing degradation of a resin can be provided. Furthermore, according to one aspect of the present embodiment, for example, a method of recycling carbon fibers that can obtain a carbon fiber reinforced plastic while suppressing degradation of the carbon fibers and the resin can be provided.

DETAILED DESCRIPTION

The present embodiment is a method of recycling carbon fibers that includes a step of preparing a carbon fiber reinforced plastic molded product that includes a carbon fiber reinforced plastic containing carbon fibers and a resin, and a step of drawing the carbon fiber reinforced plastic while performing a heating treatment on the carbon fiber reinforced plastic molded product. A temperature of the heating treatment is equal to or above a glass-transition temperature of the resin and below a thermal decomposition start temperature, and the temperature is below a thermal degradation temperature of the carbon fibers.

The following describes the present embodiment in detail.

The present embodiment is a method of recycling carbon fibers from carbon fiber reinforced plastic molded products.

A carbon fiber reinforced plastic molded product includes carbon fiber reinforced plastic containing carbon fibers and a resin. The carbon fibers are continuous carbon fibers. The carbon fiber reinforced plastic molded product is not particularly limited, and includes, for example, a tank. The tank, for example, may be a hydrogen tank for accumulating hydrogen. In the following example, a tank is mainly used as an example of a carbon fiber reinforced plastic molded product, but the present embodiment is not limited thereto. Although the present embodiment relates to a method of recycling carbon fibers, in the present disclosure, the method of recycling carbon fibers is understood as a method of manufacturing carbon fiber and/or carbon fiber reinforced plastic from a carbon fiber reinforced plastic molded product.

Figure 1:
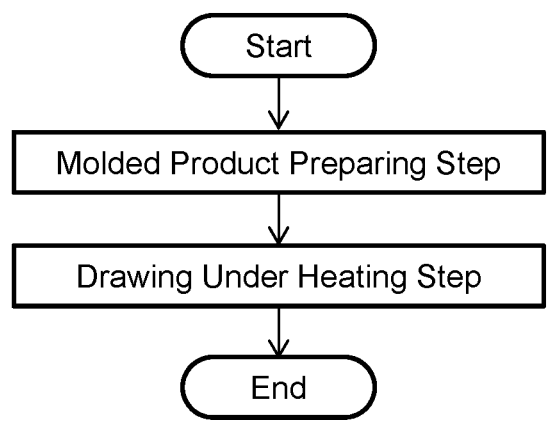
FIG. 1 is an exemplary flowchart for describing a method according to the present embodiment.

FIG. 1 illustrates an exemplary flowchart for describing a method according to the present embodiment. As illustrated in FIG. 1, the present embodiment at least includes the molded product preparing step and the drawing under heating step. The following describes each step in detail.

(Molded Product Preparing Step)

A recycling method according to the present embodiment includes a step of preparing a carbon fiber reinforced plastic molded product including a carbon fiber reinforced plastic containing carbon fibers and a resin.

As described above, the carbon fiber reinforced plastic molded product is not particularly limited, and includes, for example, a tank. The carbon fiber reinforced plastic molded product to be prepared may be, for example, one that is used for respective purposes after being manufactured and collected afterwards, and a defective product at a manufacturing stage.

Figure 2:
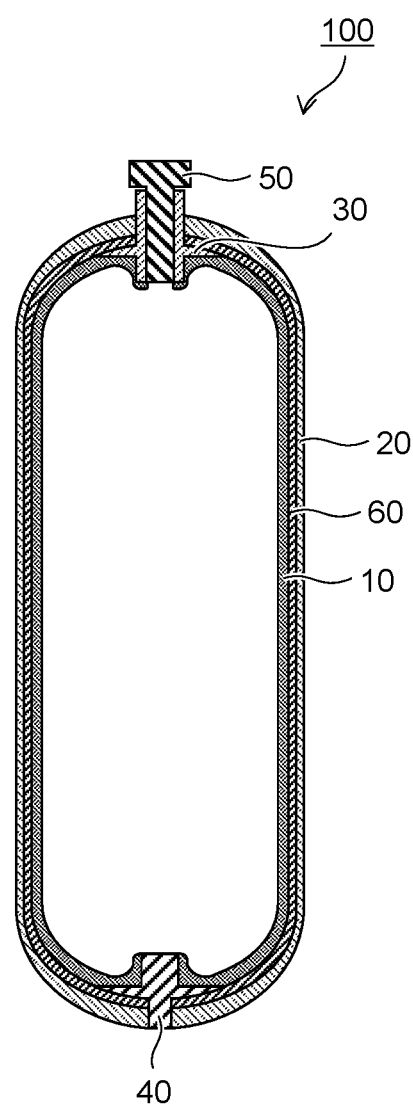
FIG. 2 is a schematic cross-sectional view illustrating an exemplary configuration of a tank 100 as a carbon fiber reinforced plastic molded product.

FIG. 2 is a cross-sectional view illustrating an exemplary configuration of a tank 100. FIG. 2 illustrates a cross-sectional view taken along a surface that is parallel to a central axis of the tank 100 and passes through the central axis. The central axis of the tank 100 corresponds to the axis that runs through the center of a circle of the main body of the tank having an approximately cylindrical shape. The tank 100 can be used, for example, for filling up gas, such as compressed hydrogen. For example, the tank 100 in a state of being filled up with compressed hydrogen is mounted on a fuel cell vehicle for supplying hydrogen to a fuel cell.

The tank 100 includes a liner 10 (made of nylon resin), a carbon fiber reinforced resin layer 20 as an outer shell, a valve-side base 30, an end-side base 40, and a valve 50. Furthermore, a protective layer 60 is arranged between the liner 10 and the carbon fiber reinforced resin layer 20. The liner 10 has a hollow shape provided with a space that is internally filled up with hydrogen, and has a gas barrier property to seal the internal space so as not to let the hydrogen leak to outside.

The carbon fiber reinforced resin layer 20 is a resin layer formed to cover outsides of the liner 10 and the protective layer 60. The carbon fiber reinforced resin layer 20 is formed to cover an outer surface of the protective layer 60. The protective layer 60 is formed to cover an inner surface of the carbon fiber reinforced resin layer 20, and to also cover parts of the bases 30, 40. The carbon fiber reinforced resin layer 20 has a function to mainly reinforce the liner 10 (reinforcing layer). The liner 10 is formed to cover an inner surface of the protective layer 60.

In FIG. 2, the valve-side base 30 has an approximately cylindrical shape, and is inserted and secured between the liner 10 and the protective layer 60. An approximately cylindrical shaped opening of the valve-side base 30 functions as an opening of the tank 100. In the present embodiment, the valve-side base 30 can be formed of stainless steel as an example, but it may also be made of other metals, such as aluminum, or be made of resin. In the valve 50, a male screw is formed in a column-shaped part, and by the male screw being screwed to a female screw formed on an inner surface of the valve-side base 30, the opening of the valve-side base 30 is closed by the valve 50. The end-side base 40 may be made of aluminum as an example, and is assembled such that a part of itself is exposed to outside for conducting heat inside the tank to outside.

The carbon fiber reinforced resin layer contains the carbon fibers and a resin (matrix resin).

The resin is not particularly limited, and includes, for example, phenolic resin, urea resin, unsaturated polyester resin, vinyl ester resin, polyimide resin, bismaleimide resin, polyurethane resin, diallyl phthalate resin, epoxy resin, or a mixture of these. As the resin, the epoxy resin is used in some embodiments. As the epoxy resin, one that is conventionally known in the technical field can be used. The epoxy resin is not limited, and includes, for example, bisphenol A type epoxy resin, bisphenol AD type epoxy resin, bisphenol F type epoxy resin, phenol novolac type epoxy resin, cresol novolac type epoxy resin, or glycidyl ester type epoxy resin. The epoxy resin may be a straight chain type or a branch type. One type of resin may be used alone, or two or more types may be used in combination. The resin may be, for example, a thermoplastic resin or a thermosetting resin. The resin comprises the thermoplastic resin in some embodiments.

The carbon fibers may be prepared in a method conventionally known in the technical field. The carbon fibers are only necessary to be materials that contain carbon as the main component, and for example, may be carbon fibers that use acrylic as a raw material, carbon fibers that use pitch as a raw material, or carbon fibers that use polyvinyl alcohol as a raw material. Especially, PAN-based carbon fibers manufactured using polyacrylonitrile fibers as a raw material are used in some embodiments.

The carbon fiber reinforced resin layer may be formed, for example, by a filament winding method. A filament winding molded product can be manufactured by aligning a plurality of carbon fiber bundles as necessary, impregnating the carbon fiber bundles with a matrix resin, and winding the carbon fiber bundles to a rotating substrate body or a mold in an appropriate angle by applying tension until reaching an appropriate thickness.

(Drawing Under Heating Step)

The recycling method according to the present embodiment includes a step of drawing the carbon fiber reinforced plastic while performing a heating treatment on the carbon fiber reinforced plastic molded product. Furthermore, a temperature of the heating treatment is equal to or above a glass-transition temperature and below a thermal degradation temperature of the resin, and the temperature is below a thermal decomposition start temperature of the carbon fibers.

The heating treatment in the present embodiment allows the resin in the carbon fiber reinforced plastic molded product to soften, while suppressing a thermal decomposition of the resin and a strength decrease of the carbon fibers. In the present embodiment, since the carbon fiber reinforced plastic molded product is heated at equal to or above the glass-transition temperature of the resin, the resin in the carbon fiber reinforced plastic molded product softens. In the embodiment, since the carbon fiber reinforced plastic is drawn while the heating treatment is performed on the carbon fiber reinforced plastic molded product to soften the resin, the carbon fiber reinforced plastic can be easily drawn from the carbon fiber reinforced plastic molded product. Specifically, the carbon fiber reinforced plastic can be drawn from the carbon fiber reinforced plastic molded product using a smaller tensile force. By using a small tensile force for drawing, tear and damage of the carbon fibers can be suppressed. Meanwhile, in the present embodiment, since the carbon fiber reinforced plastic molded product is heated at a temperature below the thermal decomposition start temperature, the thermal decomposition of the resin can be suppressed. By suppressing the thermal decomposition of the resin, an excessive deformation and carbonization of the resin can be suppressed, and as a result, even in a case where a dissolution treatment is performed in a post-process, the resin in the carbon fiber reinforced plastic can be easily dissolved. Furthermore, by suppressing the thermal decomposition of the resin, the strength decrease of the resin can be suppressed, and therefore the drawn carbon fiber reinforced plastic can be used for other purposes as itself or by receiving desired treatments (such as cutting), without undergoing the removing step of the resin. Furthermore, in the present embodiment, since the carbon fiber reinforced plastic molded product is heated at below the thermal degradation temperature of the carbon fibers, the thermal degradation of the carbon fibers can be suppressed, and the strength decrease of the carbon fibers can also be suppressed.

As described above, in the recycling method according to the present embodiment, the carbon fiber reinforced plastic is drawn while performing a heating treatment on the carbon fiber reinforced plastic molded product.

In the present embodiment, "drawing the carbon fiber reinforced plastic" means drawing the carbon fiber reinforced plastic in a continuous state from the carbon fiber reinforced plastic molded product, and also includes a concept of stripping off the carbon fiber reinforced plastic from the carbon fiber reinforced plastic molded product. In the present embodiment, since the carbon fiber reinforced plastic is drawn in a state where the resin in the carbon fiber reinforced plastic molded product is softened by heating, the carbon fiber reinforced plastic can be drawn easily. When drawing the carbon fiber reinforced plastic from the carbon fiber reinforced plastic molded product, a blade shaped tool may be used to strip off the carbon fiber reinforced plastic. Bringing the blade shaped tool into contact with a part (resin part) between the carbon fiber reinforced plastic and the molded product so as to sever the molded product and the carbon fiber reinforced plastic at a bonding portion (resin part) between the molded product and the carbon fiber reinforced plastic facilitates the stripping of the carbon fiber reinforced plastic.

The method of drawing the carbon fiber reinforced plastic is not particularly limited, and for example, the drawing is possible by directly or indirectly connecting an end portion of the carbon fiber reinforced plastic to a winding roller, and rotating the roller.

The heating treatment can, for example, be performed inside a heat treatment chamber. The carbon fiber reinforced plastic molded product is heated inside the heat treatment chamber to soften the matrix resin in the carbon fiber reinforced plastic molded product. The heat treatment chamber may be a heating furnace or a heating device that is provided with a space that internally introduces and/or discharges the heating medium.

Figure 3:
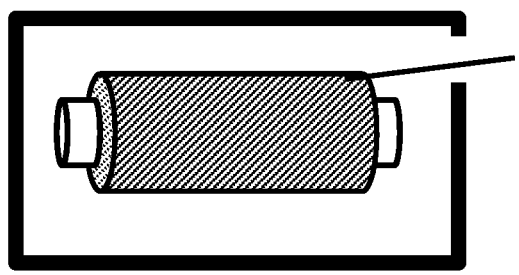
FIG. 3 is a schematic diagram for describing a drawing step under heating in the present embodiment.

A method of drawing the carbon fiber reinforced plastic while performing a heating treatment on the carbon fiber reinforced plastic molded product may be, for example, as illustrated in FIG. 3, a method of arranging the carbon fiber reinforced plastic molded product in the heat treatment chamber and drawing a part of the carbon fiber reinforced plastic from the heat treatment chamber while performing the heating treatment. The carbon fiber reinforced plastic may, for example, be conveyed to outside from a carry-out port disposed to a part of the heat treatment chamber. The conveyance of the carbon fiber reinforced plastic may, for example, be performed successively by a conveyance roller.

In the present embodiment, the temperature of the heating treatment is equal to or above the glass-transition temperature and below the thermal decomposition start temperature of the resin, and the heating treatment is below the thermal degradation temperature of the carbon fibers.

In the present embodiment, by heating the carbon fiber reinforced plastic molded product at equal to or above the glass-transition temperature of the resin, the resin turns into a softened state, and the carbon fiber reinforced plastic can be drawn using a smaller tensile force. Furthermore, the drawing with a small tensile force also ensures the suppressed tear and damage of the carbon fibers. Heating the carbon fiber reinforced plastic molded product at a temperature below the thermal decomposition start temperature of the resin ensures the suppressed thermal decomposition of the resin. By suppressing the thermal decomposition of the resin, an excessive deformation and carbonization of the resin can be suppressed, and as a result, even in a case where a dissolution treatment is performed in a post-process, the resin in the carbon fiber reinforced plastic can be easily dissolved using the dissolution liquid. Furthermore, by suppressing the thermal decomposition of the resin, a strength decrease of the resin can be suppressed, and the drawn carbon fiber reinforced plastic can be used for other purposes as itself or in some cases, by receiving desired treatments (such as cutting) without undergoing the removing step of the resin.

The thermal decomposition start temperature can be measured using a heat weight measurement device.

In the present embodiment, the thermal decomposition start temperature may be a temperature that indicates a 5% weight loss in a weight change chart of a thermogravimetric analysis obtained by raising the temperature of the resin from 30° C. to 550° C. by 5° C./minute under a nitrogen atmosphere. The thermal decomposition start temperature may be a temperature that indicates a 3% weight loss in a weight change chart of a thermogravimetric analysis obtained by raising the temperature of the resin from 30° C. to 550° C. by 5° C./minute under a nitrogen atmosphere. The thermal decomposition start temperature may be a temperature that indicates a 1% weight loss in a weight change chart of a thermogravimetric analysis obtained by raising the temperature of the resin from 30° C. to 550° C. by 5° C./minute under a nitrogen atmosphere. Generally, the above-described thermal decomposition start temperature under a nitrogen atmosphere is considered to be a start temperature of a decomposition of a main chain and/or side chain of the resin.

In the present embodiment, the thermal decomposition start temperature may be a temperature that indicates a 5% weight loss in a weight change chart of a thermogravimetric analysis obtained by raising the temperature of the resin from 30° C. to 550° C. by 5° C./minute under an air atmosphere. The thermal decomposition start temperature may be a temperature that indicates a 3% weight loss in a weight change chart of a thermogravimetric analysis obtained by raising the temperature of the resin from 30° C. to 550° C. by 5° C./minute under an air atmosphere. The thermal decomposition start temperature may be a temperature that indicates a 1% weight loss in a weight change chart of a thermogravimetric analysis obtained by raising the temperature of the resin from 30° C. to 550° C. by 5° C./minute under an air atmosphere. Generally, when heating is done in air, since an oxidative degradation proceeds due to oxygen contained in the air, the thermal decomposition start temperature measured in an air atmosphere is below the thermal decomposition start temperature measured in a nitrogen atmosphere when assuming that weight loss ratios in the two atmospheres are the same.

In the present embodiment, by heating the carbon fiber reinforced plastic molded product at below the thermal degradation temperature of carbon fibers, a strength decrease of the carbon fibers can be suppressed. The thermal degradation temperature of the carbon fibers can be defined as a lowest temperature at which a decrease of tensile strength by 1% or more occurs in a case where the heating treatment is performed on the carbon fibers in air. By measuring the tensile strength before and after the heating treatment of the carbon fibers used in the carbon fiber reinforced plastic, a strength decrease can be calculated.

In one embodiment, the temperature of the heating treatment may be equal to or above 100° C., may be equal to or above 120° C., may be equal to or above 140° C., may be equal to or above 160° C., may be equal to or above 180° C., or may be equal to or above 200° C. Furthermore, the temperature of the heating treatment may be below 400° C., may be equal to or below 390° C., may be equal to or below 380° C., may be equal to or below 370° C., may be equal to or below 360° C., may be equal to or below 350° C., may be equal to or below 340° C., may be equal to or below 330° C., may be equal to or below 320° C., may be equal to or below 310° C., may be equal to or below 300° C., may be equal to or below 290° C., or may be equal to or below 280° C. In a case where the temperature of the heating treatment is equal to or above 100° C., the resin in the carbon fiber reinforced plastic can be effectively softened. In a case where the temperature of the heating treatment is below 400° C., the thermal decomposition of the resin in the carbon fiber reinforced plastic can be easily suppressed, and the degradation of the carbon fibers can also be easily suppressed. The upper limit values and/or the lower limit values of these numerical ranges can be conveniently combined to specify intended ranges.

Figure 4A:
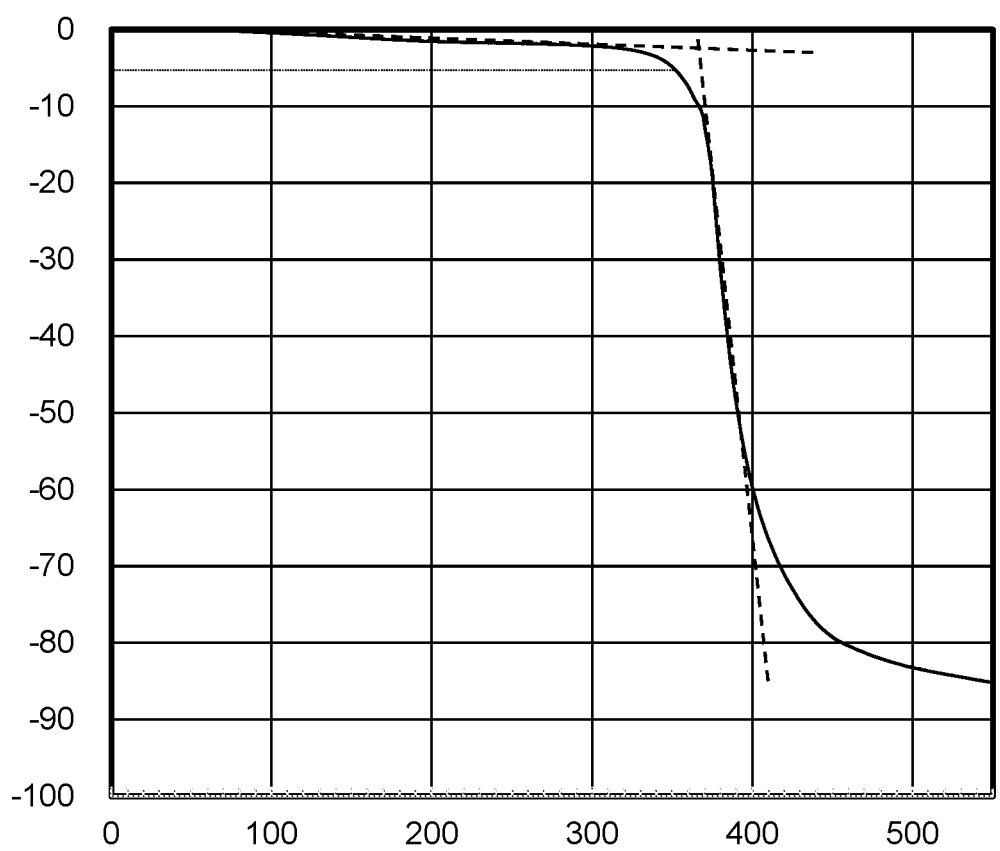
FIG. 4A is a graph illustrating an exemplary thermal property of an epoxy resin, the graph (horizontal axis: temperature, vertical axis: weight loss rate) illustrating a weight change chart (curved line TG) of a thermogravimetric analysis obtained by raising a temperature of the resin under a nitrogen atmosphere.
Figure 4B:
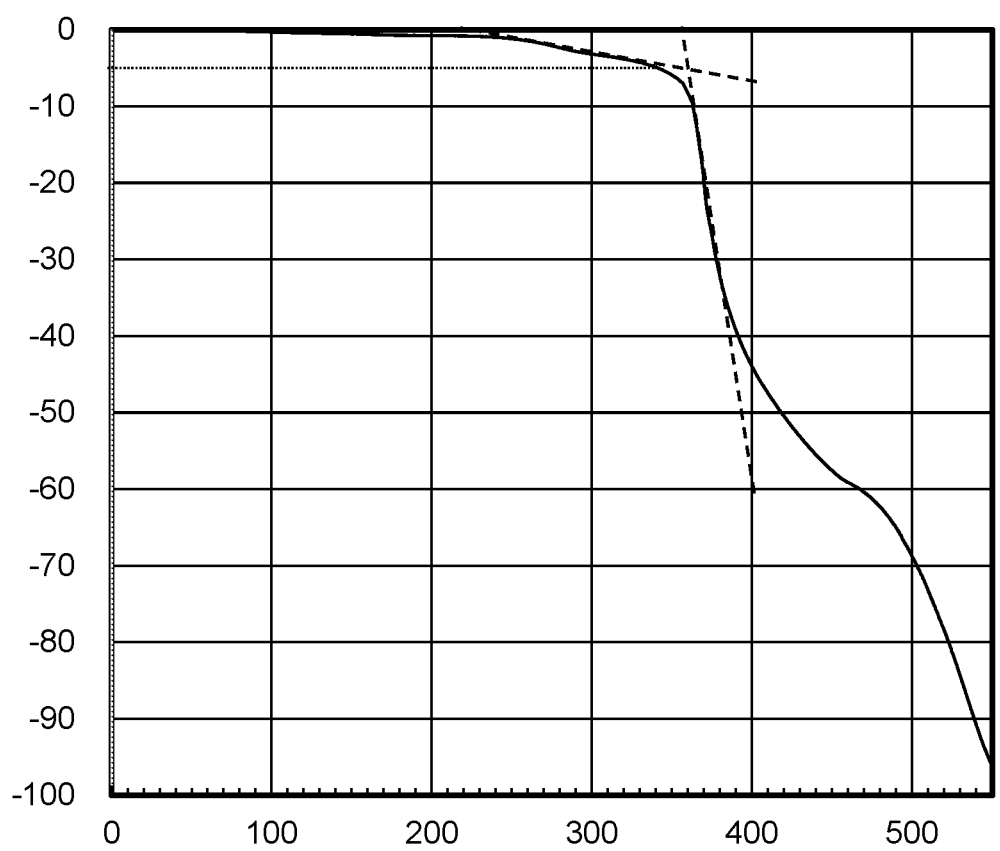
FIG. 4B is a graph illustrating an exemplary thermal property of an epoxy resin, the graph (horizontal axis: temperature, vertical axis: weight loss rate) illustrating a weight change chart (curved line TG) of a thermogravimetric analysis obtained by raising the temperature of the resin under an air atmosphere.

As an example, the glass-transition temperature of the epoxy resin is approximately from 100° C. to 200° C., and the thermal decomposition start temperature of the epoxy resin is approximately from 240° C. to 360° C. By heating at a temperature equal to or above the thermal decomposition start temperature, the thermal decomposition of the resin occurs excessively, and the strength of the resin largely decreases. Furthermore, an excessive deformation and carbonization of the resin occur, causing difficulty to dissolve and remove the resin using a dissolution liquid. FIG. 4A relates to an exemplary epoxy resin, illustrating a weight change chart of a thermogravimetric analysis obtained by raising the temperature of the resin from 30° C. to 550° C. by 5° C./minute under a nitrogen atmosphere. In FIG. 4A, a temperature indicating a 5% weight loss is approximately 350° C., which can be specified as the thermal decomposition start temperature. Furthermore, FIG. 4B relates to an exemplary epoxy resin, illustrating a weight change chart of a thermogravimetric analysis obtained by raising the temperature of the resin from 30° C. to 550° C. by 5° C./minute under an air atmosphere. FIG. 4A and FIG. 4B also illustrate inflection points. In FIG. 4B, a temperature indicating a 5% weight loss is approximately 340° C., which can be specified as the thermal decomposition start temperature in the present embodiment. As described above, when heating is performed in air, since an oxidative degradation proceeds due to oxygen contained in the air, the thermal decomposition start temperature measured in an air atmosphere is below the thermal decomposition start temperature measured in a nitrogen atmosphere when weight loss ratios in the two atmospheres are the same. In a temperature equal to or above the thermal decomposition start temperature, the thermal decomposition of the resin occurs excessively, allowing the decomposition of the main chain and/or the side chain of the resin to occur excessively, and, in some cases, causes the carbonization of the resin. When such thermal decomposition occurs, the resin becomes difficult to be dissolved and removed using the dissolution liquid. Furthermore, since the strength of the resin decreases, the carbon fiber reinforced plastic itself can no longer be used. Meanwhile, in a range within the glass-transition temperature or more and less than the thermal decomposition start temperature specified in the present embodiment, since the resin can be softened while suppressing the thermal decomposition, by drawing the carbon fiber reinforced plastic in this state, a high-quality continuous carbon fiber reinforced plastic can be easily obtained. A thermogravimetric analysis is a method of measuring the weight change in a case where the temperature of the substance is changed according to a predetermined program. In the present embodiment, a thermogravimetric analysis can be performed by measuring a weight change in a case where a specimen of approximately 10 mg is arranged in a container made of aluminum, alumina or platinum, for example, and the temperature is raised at a constant heating rate (5° C./minute).

In the present embodiment, from a perspective of suppressing the thermal decomposition of the resin more effectively, the temperature of the heating treatment may be below the thermal decomposition start temperature by 1° C. or more, may be below the thermal decomposition start temperature by 5° C. or more, may be below the thermal decomposition start temperature by 10° C. or more, may be below the thermal decomposition start temperature by 15° C. or more, may be below the thermal decomposition start temperature by 20° C. or more, may be below the thermal decomposition start temperature by 25° C. or more, or may be below the thermal decomposition start temperature by 30° C. or more.

Figure 5:
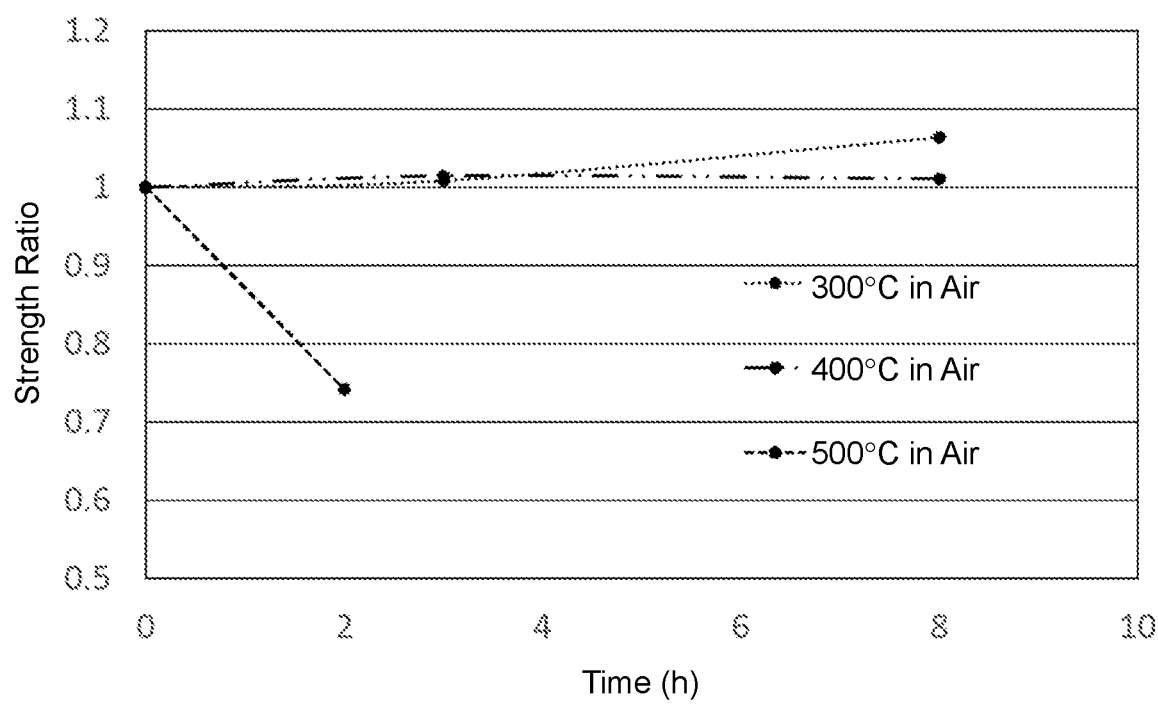
FIG. 5 is a graph illustrating a thermal property of carbon fibers, the graph illustrating a strength ratio (tensile strength after heating/tensile strength before heating) when heating the carbon fibers in air, at a predetermined temperature (300° C., 400° C., 500° C.) for a predetermined period (horizontal axis)

FIG. 5 is a graph illustrating the thermal property of the carbon fibers, the graph illustrating a strength ratio (tensile strength after heating/tensile strength before heating) when the carbon fibers are heated in air at a predetermined temperature (300° C., 400° C., 500° C.) for a predetermined period (horizontal axis). As illustrated in FIG. 5, it can be understood that the strengths of the carbon fibers do not decrease even when the carbon fibers are heated at 400° C. Meanwhile, when the carbon fibers are heated at 500° C. which is a temperature of a conventionally general heating treatment, it can be understood that the strengths of the carbon fiber does decrease. This is considered to result from an oxidative degradation of the carbon fibers caused by heat and oxygen. Generally, in many cases, the thermal decomposition start temperature of the resin is considered to be below the thermal degradation temperature of the carbon fibers.

Figure 6:
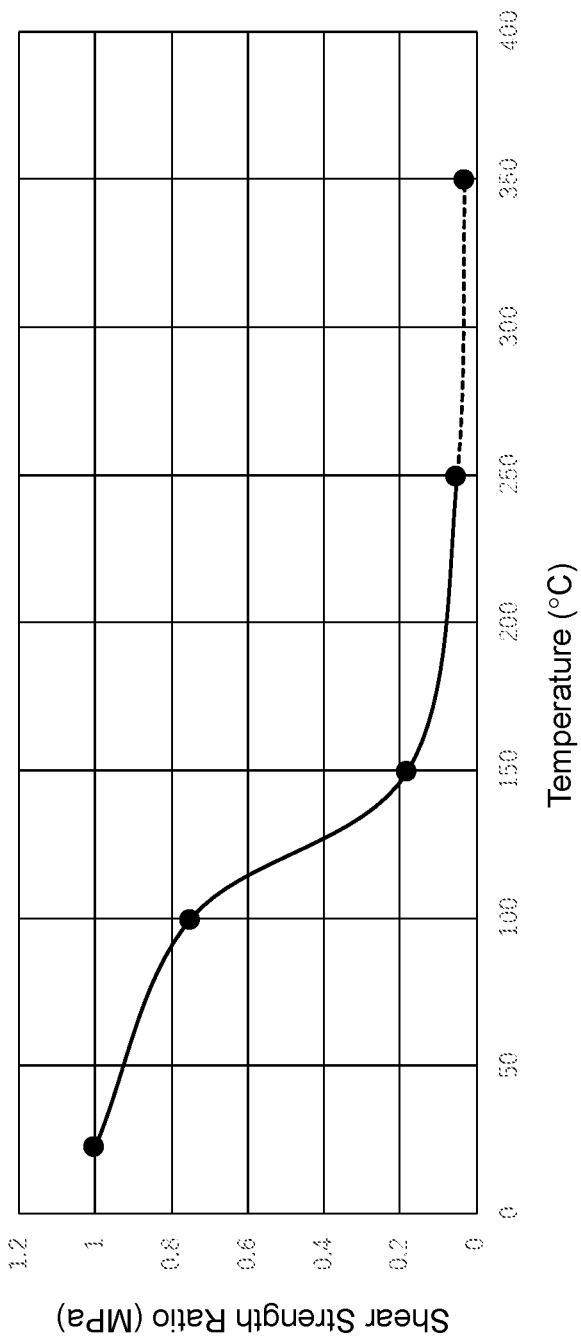
FIG. 6 is a graph illustrating a tensile shear strength ratio (tensile shear strength during heating/tensile shear strength before heating) at a predetermined temperature of the epoxy resin.
Figure 7:
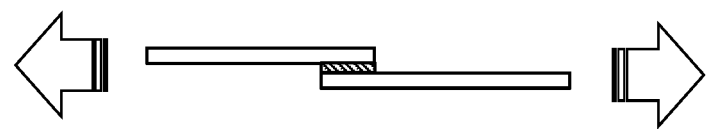
FIG. 7 is a schematic diagram for describing a configuration of a test piece used in a tensile shear strength test for measuring a tensile shear strength ratio illustrated in FIG. 6.

FIG. 6 is a graph illustrating a tensile shear strength ratio at a predetermined temperature of the resin (epoxy resin, see FIG. 4A and FIG. 4B). Specifically, FIG. 6 illustrates a tensile shear strength ratio (tensile shear strength during heating/tensile shear strength before heating (strength at 23° C.), vertical axis, mark) at a predetermined temperature (23° C., 100° C., 150° C., 250° C., horizontal axis). The dotted line from 250° C. to 350° C. illustrates a virtual curved line. As illustrated in FIG. 7, the tensile shear strength is a strength when two plates are bonded by the resin and an adhesively bonded portion is broken by shear stress that is a load that tries to shift the adherents in the opposite direction from one another. As illustrated in FIG. 6, as the heating temperature of the resin is raised higher, the tensile shear strength decreases. In a state where the tensile shear strength decreases, the carbon fiber reinforced plastic can be easily drawn. For example, in a case where the heating temperature is 150° C., the tensile shear strength ratio is 0.2 or below, and the tensile shear strength during the heating is 20% or below compared with the tensile shear strength before the heating, indicating that the carbon fiber reinforced plastic can be drawn using a smaller force. In the present embodiment, the temperature of the heating treatment may be a temperature at which the tensile shear strength ratio is 20% or below, may be a temperature at which the tensile shear strength ratio is 15% or below, may be a temperature at which the tensile shear strength ratio is 10% or below, or may be a temperature at which the tensile shear strength ratio is 5% or below.

In the present embodiment, the carbon fiber reinforced plastic molded product is usually not crushed or pulverized. As the carbon fiber reinforced plastic molded product, a tubular portion alone of a tank may be used. Metal components and the like in the carbon fiber reinforced plastic molded product may be removed before or after the heating step.

The heating method is not particularly limited. The heating method may be, for example, heating in air. A heating treatment in air can be easily performed and is also advantageous in terms of cost. Especially, the present embodiment is effective since the deterioration of the carbon fibers can be suppressed even under a condition in which oxygen in air or the like exists. Furthermore, the heating treatment can be performed using superheated steam. By using superheated steam, the proportion of air containing oxygen under a treatment atmosphere can be reduced, and thus decomposition and damage of the carbon fibers can be effectively suppressed. For example, the heating treatment can be performed by introducing normal pressure superheated steam into a normal pressure reaction vessel. Furthermore, the heating treatment is not particularly limited but may be performed under an inert atmosphere, such as nitrogen. The heating treatment may also be performed by supplying heated superheated steam and/or inert gas (such as nitrogen) into the heat treatment chamber.

In the method of recycling carbon fibers according to the present embodiment, the carbon fiber reinforced plastic drawn in the drawing under heating step is kept in a bundled state by the carbon fibers and the matrix resin. As described above, in the present embodiment, the carbon fiber reinforced plastic can be directly reused since the strength decrease of the resin and the carbon fibers are suppressed. Furthermore, depending on cases, the obtained carbon fiber reinforced plastic may be reused by receiving desired processing treatments. The processing treatment may be, for example, a treatment of cutting up the carbon fiber reinforced plastic in desired dimensions. For example, by hardening the cut up carbon fiber reinforced plastic appropriately mixed with binder resin and the like, a sheet-shaped product can be manufactured.

(Removing Step)

The recycling method according to the present embodiment may include a step of removing the resin in the carbon fiber reinforced plastic to obtain the carbon fibers. The removal method of the resin in the carbon fiber reinforced plastic is not particularly limited, but may be a dissolution and removal using a dissolution liquid. The dissolution and removal using a dissolution liquid can suppress the degradation of the carbon fibers.

The following describes a dissolving and removing step using a dissolution liquid as an exemplary removing step of the resin.

The dissolving and removing step is a step of removing the resin in the drawn carbon fiber reinforced plastic by dissolving the resin using the dissolution liquid.

In one embodiment, the resin in the drawn carbon fiber reinforced plastic is removed in the dissolving and removing step. By bringing the carbon fiber reinforced plastic into contact with the dissolution liquid, the resin can be dissolved and removed. By the dissolving and removal, stress due to heat can be avoided and the degradation of the carbon fibers can be suppressed. Specifically, a removal using the dissolution liquid causes less degradation of the carbon fibers than the removal by thermal decomposition. Furthermore, in the present embodiment, since excessive deformation and carbonization of the resin are suppressed in the drawing under heating step, which is the previous step, the resin in the carbon fiber reinforced plastic can be dissolved efficiently.

The dissolution of the resin is performed using a dissolution liquid that can dissolve the resin in the carbon fiber reinforced plastic. The dissolution liquid is only necessary to be one that can dissolve the resin, and includes, for example, at least one liquid selected from an acidic solution, an organic solvent, an aqueous hydrogen peroxide, or an ionic liquid. These liquids can dissolve the resin and swell the resin to efficiently remove the resin. One type of dissolution liquid may be used alone, or two or more types may be used in combination.

The acidic solution may be, for example, phosphoric acid and sulfuric acid. The acidic solution may be, for example, a solution containing sulfuric acid (by a density of 90 mass % or more, for example) as described in Japanese Unexamined Patent Application Publication No. 2020-37638, or a solution containing phosphoric acid as described in Japanese Unexamined Patent Application Publication No. 2020-50704. One type of acidic component may be used alone, or two or more types may be used in combination.

The organic solvent may be, for example, an aliphatic hydrocarbon-based solvent, an aromatic hydrocarbon-based solvent, an alcohol-based solvent, a ketone-based solvent, an ether-based solvent, an amide-based solvent, or an ester-based solvent. One type of organic solvent may be used alone, or two or more types may be used in combination. The aliphatic hydrocarbon-based solvent may be, for example, pentane, hexane, heptane, or octane. The aromatic hydrocarbon-based solvent may be, for example, benzene, toluene, or xylene. An organic solvent that includes two or more types of components may be, for example, petroleum benzine or ligroin. The organic solvent may include a decomposition catalyst. The decomposition catalyst may be, for example, an alkali metal compound, such as described in Japanese Unexamined Patent Application Publication No. 2020-45407.

The ionic liquid may be, for example, an ionic liquid that contains at least one cation selected from an imidazolium-based cation, a pyridinium-based cation, a pyrrolidinium-based cation, a quaternary ammonium-based cation, or a quaternary phosphonium-based cation. One type of ionic liquid may be used alone, or two or more types may be used in combination.

Figure 8:
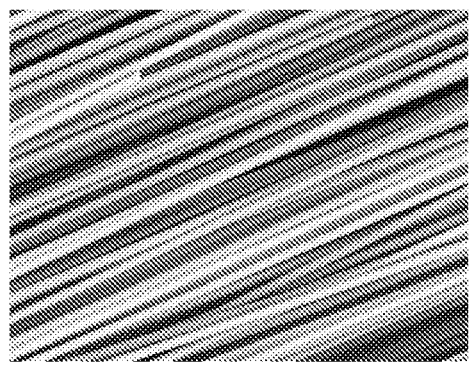
FIG. 8 is a photograph of the carbon fibers observed by SEM after immersing the carbon fiber reinforced plastic into a concentrated sulfuric acid to dissolve and remove the resin.

FIG. 8 is a photograph of the carbon fibers observed by SEM, the carbon fibers obtained by dissolving and removing the resin by immersing the carbon fiber reinforced plastic into a concentrated sulfuric acid. A temperature of the concentrated sulfuric acid may be, for example, 100° C. to 300° C. As indicated in FIG. 8, the resin can be efficiently removed from the carbon fiber reinforced plastic by using the dissolution liquid. Furthermore, a substantial decrease in strength of the carbon fibers after removing the resin using the dissolution liquid was not recognized.

The dissolution and removal of the resin is performed by bringing the dissolution liquid in contact with the carbon fiber reinforced plastic. The method of bringing the dissolution liquid in contact with the carbon fiber reinforced plastic is not particularly limited, and includes, for example, a dipping method, a die coating method, a bar coating method, a roll coating method, or a gravure coating method. Among these, the dipping method is used in some embodiments. Specifically, the dissolution liquid may be brought into contact with the carbon fibers by conveying the carbon fiber reinforced plastic using a roller so as to immerse the carbon fiber reinforced plastic into the dissolution liquid arranged in a bath. In one embodiment, the drawn carbon fiber reinforced plastic can be immersed into the dissolution liquid while being conveyed using a conveyance roller.

A dissolution degree of the resin in the dissolving and removing step can be adjusted according to a type of dissolution liquid, treatment temperature, treatment period, or the like. The treatment period can be adjusted by, for example, a conveyance speed of the carbon fiber reinforced plastic. The treatment period is not particularly limited, and can be appropriately set according to the types of dissolution liquid, resin, and the like.

A temperature of the dissolution liquid (liquid temperature) can be appropriately set considering a degree of the dissolving and removal. The temperature of the dissolution liquid (liquid temperature) may be, for example, 20° C. or above, 40° C. or above, 60° C. or above, 80° C. or above, and for example, 300° C. or below, 250° C. or below, 200° C. or below, 150° C. or below, or 100° C. or below.

The dissolving and removal of the resin may be performed by injecting the dissolution liquid to the carbon fiber reinforced plastic. That is, by applying injection pressure to the dissolution liquid to bring the dissolution liquid into contact with the carbon fiber reinforced plastic, the resin in the carbon fiber reinforced plastic can be removed using the injection pressure. The injection device used for injecting the dissolution liquid is not particularly limited, and for example, a high pressure cleaning device can be used.

A nozzle pressure for injecting the dissolution liquid may be 1 MPa or above, may be 5 MPa or above, may be 8 MPa or above, or may be 10 MPa or above. With the pressure mentioned above, the resin can be effectively removed from the carbon fiber reinforced plastic. Furthermore, the nozzle pressure may be 30 MPa or below, may be 25 MPa or below, may be 22 MPa or below, or may be 20 MPa or below. With the pressure mentioned above, damage of the carbon fibers caused by the dissolution liquid can be effectively suppressed. A distance between the nozzle and the carbon fiber reinforced plastic as the injection target when injecting the dissolution liquid may be 10 cm to 200 cm, or may be 30 cm to 100 cm.

In the dissolving and removal of the resin, the immersion into the dissolution liquid and the injection of the dissolution liquid may be performed in combination.

(Sizing Agent Applying Step)

The recycling method according to the present embodiment may include a step of adding a sizing agent to the carbon fibers obtained by removing the resin.

The carbon fibers after the removing step are substantially removed of the entire resin, and the bundle of carbon fibers is separated into single fiber forms. By applying the sizing agent on the carbon fibers, the carbon fibers can be easily rolled up as a bobbin and furthermore, fuzzing of the carbon fibers and tangling of the single fibers can be suppressed.

The sizing agent is not particularly limited and includes, for example, epoxy resin, urethane resin, vinyl ester resin, polyamide resin, nylon resin, polyolefin resin (polyethylene and polypropylene), polyester resin, phenolic resin, or a mixture of these. Among these, the epoxy resin, the urethane resin, the vinyl ester resin, or the polyolefin resin is used in some embodiments, and the epoxy resin is especially used in some embodiments. By using the epoxy resin as the sizing agent, an adhesiveness of the carbon fibers and the epoxy resin can be improved. One type of sizing agent may be used alone, or two or more types may be used in combination.

The application of the sizing agent to the carbon fibers is performed by bringing the sizing agent into contact with the carbon fibers. The applying method of the sizing agent is not particularly limited, and includes, for example, a dipping method, a die coating method, a bar coating method, a roll coating method, or a gravure coating method. Among these, the dipping method is used in some embodiments. Specifically, the sizing agent can be applied to the carbon fibers by conveying the carbon fibers using a roller so as to immerse the carbon fibers into the sizing agent arranged in a sizing bath. The sizing agent may be dispersed or dissolved in water or an organic solvent, such as acetone, and used as a dispersion liquid or a solution. From the perspective of raising a dispersibility of the sizing agent to improve a liquid stability, a surfactant may be appropriately added to the dispersion liquid or the solution.

An adding amount of the sizing agent to the carbon fibers is, for example, 0.1 to 10 parts by mass in a case where the total amount of the carbon fibers and the sizing agent is 100 parts by mass. When the adding amount is within this range, an appropriate convergence of the carbon fibers can be obtained, and thereby sufficient rubfastness can be obtained, ensuring suppressed fuzzing due to a mechanical friction and the like.

(Winding Step)

The recycling method according to the present embodiment may include a step of winding the carbon fibers removed of the resin that are obtained in the removing step. The winding step of the carbon fibers is performed after the removing step, and in a case where the sizing agent applying step is included, the winding step may be performed after the sizing agent applying step.

The winding can be performed by, for example, using a winding roller. The winding roller is mounted with a driving device that provides a driving force to wind the carbon fibers. Furthermore, some guide rollers may be mounted with a driving device that rotates the guide rollers. A winding tension force, which is a tensile force applied to the carbon fibers, may be as small as possible. By setting the winding tension force within an appropriate range, a thread breakage and a winding deviation of the carbon fibers can be suppressed, resulting in longer continuous fibers to be obtained.

One embodiment includes a step of drawing the carbon fiber reinforced plastic while performing a heating treatment, a step of removing the resin in the carbon fiber reinforced plastic that is drawn, and a step of winding the carbon fibers that are removed of the resin, the carbon fiber reinforced plastic being drawn in an upper stream, and the carbon fibers being wound in a downstream. That is, in one embodiment, the drawing under heating step of the carbon fiber reinforced plastic is performed in the upper stream, while the winding step of the carbon fibers is performed in the downstream, and between the drawing step in the upper stream and the winding step in the downstream, a removing step and, in some cases, a sizing agent applying step is performed. Furthermore, in one embodiment, the drawing under heating step of the carbon fiber reinforced plastic is performed in the upper stream, while the winding step of the carbon fibers is performed in the downstream, and between the drawing step in the upper stream and the winding step in the downstream, a dissolving and removing step and, in some cases, the sizing agent applying step are performed. In such embodiment, since the dissolving and removing step can be performed right after the drawing under heating step, and the carbon fiber reinforced plastic can be brought into contact with the dissolution liquid at a high temperature state, the resin can be removed efficiently using the dissolution liquid. Specifically, a part (may be an end portion) of the carbon fiber reinforced plastic is taken out from the carbon fiber reinforced plastic molded product, the part of the carbon fiber reinforced plastic taken out is directly or indirectly connected to the winding machine, the winding machine applies tensile force to the carbon fiber reinforced plastic, and the carbon fiber reinforced plastic is drawn in a state of a continuous fiber. The drawn carbon fiber reinforced plastic is removed of the resin using the dissolution liquid. Accordingly, the obtained carbon fibers that are removed of the resin are wound by the winding machine.

In the method of recycling carbon fibers according to the present embodiment including the steps described above, appropriately reusable carbon fibers can be obtained efficiently.

Figure 9:
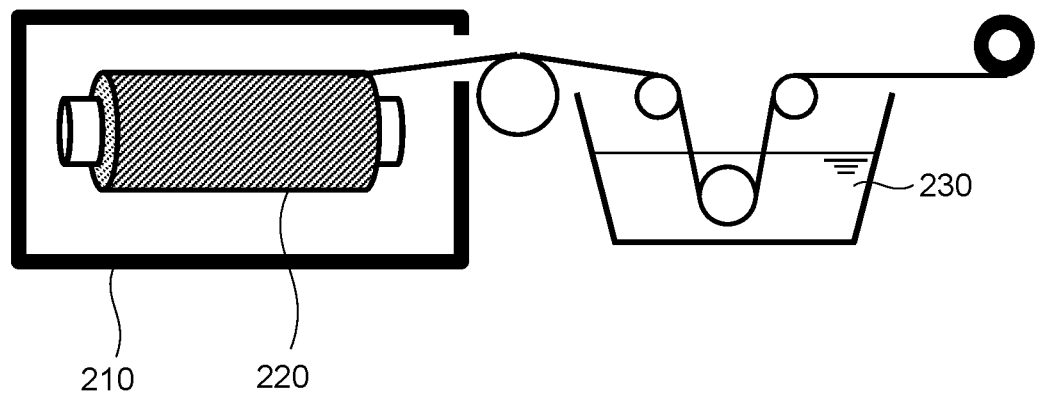
FIG. 9 is a schematic diagram for describing one aspect of the present embodiment.
Figure 10:
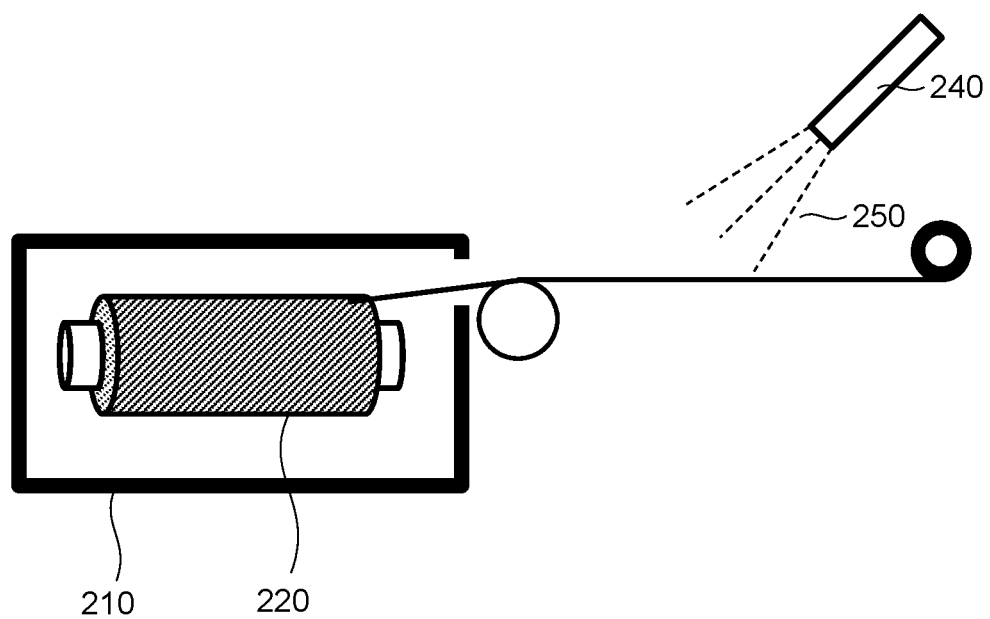
FIG. 10 is a schematic diagram for describing one aspect of the present embodiment.
Figure 11:
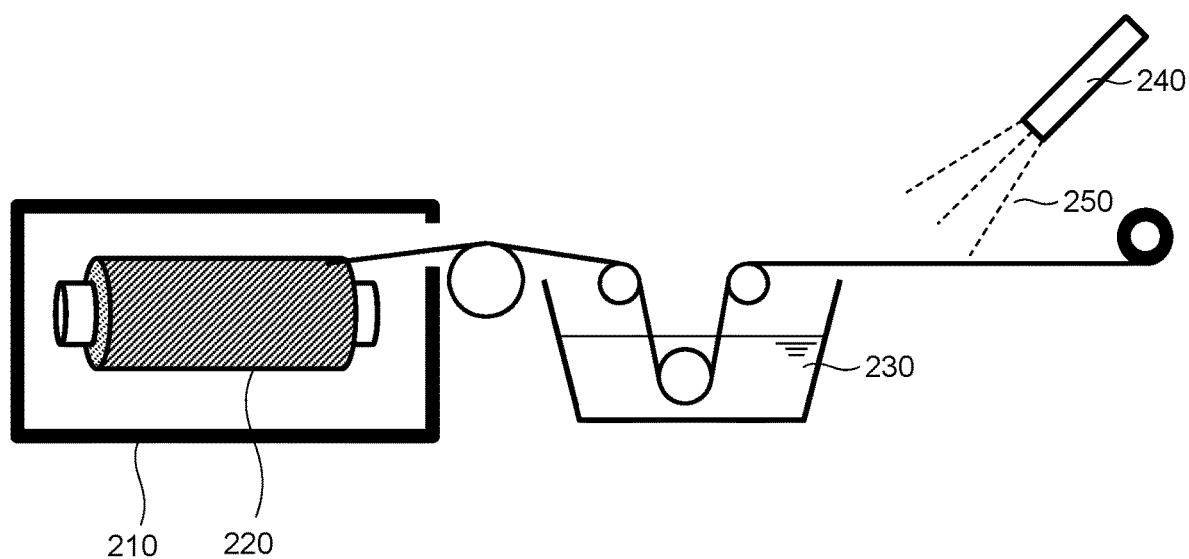
FIG. 11 is a schematic diagram for describing one aspect of the present embodiment.

The following describes specific examples of the present embodiment with reference to FIG. 9 to FIG. 11. Although the following examples of the present embodiment illustrated in FIG. 9 to FIG. 11 do not illustrate the molded product preparing step and the sizing agent applying step, the carbon fiber reinforced plastic molded product supplied in the treatment step of each embodiment is one prepared in the molded product preparing step. Furthermore, in the example of each embodiment, the sizing agent applying step may be performed as desired.

FIG. 9 is a schematic diagram for describing one aspect of the present embodiment. In the embodiment illustrated in FIG. 9, the drawing under heating step is performed in the upper stream, followed by the removing step (immersion into the dissolution liquid), and subsequently the winding step is performed in the downstream. Specifically, a carbon fiber reinforced plastic molded product 200 is housed in a device 210 capable of a heating treatment, such as a heat treatment chamber, and the carbon fiber reinforced plastic is drawn under a heating treatment (drawing under heating step). In the heat treatment chamber, a tank is installed to a shaft that can be rotationally driven, and the carbon fiber reinforced plastic is drawn from the tank under heating. Next, the drawn carbon fiber reinforced plastic is immersed into a dissolution liquid 230 (removing step). Subsequently, the carbon fibers that are removed of the resin are wound (winding step). The conveyance method of the carbon fiber reinforced plastic or the carbon fibers between each step is not particularly limited, and may be one, for example, which uses a guide roller, a winding roller, or a mandrel roller. Furthermore, although not illustrated, the sizing agent applying step may be performed after the removing step and before the winding step. Furthermore, a step of drying the carbon fibers after the removing step and after the sizing agent applying step may be performed.

FIG. 10 is a schematic diagram for describing one aspect of the present embodiment. In FIG. 10, the removing step is performed by injecting the dissolution liquid on the drawn carbon fiber reinforced plastic. Specifically, in FIG. 10, a dissolution liquid 250 is injected from a nozzle 240 connected to an injection device (not illustrated) toward the drawn carbon fiber reinforced plastic to remove the resin from the carbon fibers. By moving the nozzle that injects the dissolution liquid and the carbon fiber reinforced plastic, the dissolution liquid can be brought into contact with the entire carbon fiber reinforced plastic. A plurality of nozzles may be disposed. Furthermore, although not illustrated, the sizing agent applying step may be performed after the removing step and before the winding step. Furthermore, a step of drying the carbon fibers after the removing step and after the sizing agent applying step may be performed.

FIG. 11 is a schematic diagram for describing one aspect of the present embodiment. In FIG. 11, the removing step is performed by a combination of the immersion into the dissolution liquid and the injection of the dissolution liquid. Specifically, in FIG. 11, the drawn carbon fiber reinforced plastic is immersed into the dissolution liquid 230, and subsequently the dissolution liquid 250 is injected from the nozzle 240 connected to an injection device (not illustrated) toward the carbon fiber reinforced plastic to remove the resin from the carbon fibers. By combining the immersion into the dissolution liquid and the injection of the dissolution liquid, the resin can be removed more efficiently. Furthermore, although not illustrated, the sizing agent applying step may be performed after the removing step and before the winding step. Furthermore, a step of drying the carbon fibers after the removing step and after the sizing agent applying step may be performed.

According to a method of recycling carbon fibers of the present embodiment described above, high-quality carbon fibers that are appropriately reusable can be obtained efficiently. The obtained carbon fibers are applicable to a wide usage.

The upper-limit values and/or the lower limit values of the numerical ranges described in the present specification may each be combined as desired to specify intended ranges. For example, the upper-limit values and the lower limit values of the numerical ranges may be combined as desired to specify intended ranges, the upper-limit values of the numerical ranges may be combined as desired to specify intended ranges, and the lower limit values of the numerical ranges may be combined as desired to specify intended ranges.

Throughout the present specification, any mention of "one embodiment," "an embodiment," or "embodiment" means that a specific feature, structure, or property described regarding the embodiment is included in at least one embodiment. Accordingly, the cited phrases and their modifications described throughout the present specification do not all necessarily refer to the same embodiment.

Although the present embodiment has been described above in detail, the specific structure is not limited to the embodiment, and possible changes of design that do not depart from the gist of the present disclosure are included in the disclosure.

DESCRIPTION OF SYMBOLS

10 Liner
20 Carbon fiber reinforced resin layer
30 Valve-side base
40 End-side base
50 Valve
60 Protective layer
100 Tank
210 Heat treatment device (heat treatment chamber)
220 Carbon fiber reinforced plastic molded product
230 Dissolution liquid
240 Nozzle
250 Dissolution liquid

What is claimed is:
1. A method of recycling carbon fibers,
the method of recycling comprising:
preparing a carbon fiber reinforced plastic molded product including a carbon fiber reinforced plastic containing carbon fibers and a resin; and
drawing the carbon fiber reinforced plastic while performing a heating treatment on the carbon fiber reinforced plastic molded product,
removing the resin in the carbon fiber reinforced plastic that is drawn and conveyed; and
winding the conveyed carbon fibers that are removed of the resin;

wherein the carbon fiber reinforced plastic is drawn in the upper stream, while the carbon fibers are wound in the downstream;

wherein a temperature of the heating treatment is equal to or above a glass-transition temperature of the resin and below a thermal decomposition start temperature, and the temperature is below a thermal degradation temperature of the carbon fibers;

wherein the removing the resin includes bringing a dissolution liquid that dissolves the resin in the carbon fiber reinforced plastic into contact with the carbon fiber reinforced plastic, wherein in the removing the resin, the drawn carbon fiber reinforced plastic is immersed into the dissolution liquid and subsequently the dissolution liquid is injected from a nozzle connected to an injection device toward the carbon fiber reinforced plastic to remove the resin from the carbon fibers, and wherein the method of recycling further comprises, after the removing the resin and before the winding the carbon fibers, applying a sizing agent to the carbon fibers obtained by removing the resin.

2. The method according to claim 1,
wherein the thermal decomposition start temperature of the resin is a temperature indicating a 5% weight loss in a weight change chart of a thermogravimetric analysis obtained by raising the temperature of the resin from 30° C. to 550° C. by 5° C./minute under a nitrogen atmosphere.

3. The method according to claim 1,
wherein the thermal decomposition start temperature of the resin is a temperature indicating a 5% weight loss in a weight change chart of a thermogravimetric analysis obtained by raising the temperature of the resin from 30° C. to 550° C. by 5° C./minute under an air atmosphere.

4. The method according to claim 1,
wherein the temperature of the heating treatment is below 400° C.

5. The method according to claim 1,
wherein the temperature of the heating treatment is equal to or below 360° C.

6. The method according to claim 1,
wherein the dissolution liquid contains at least one liquid selected from an acidic solution, an organic solvent, an aqueous hydrogen peroxide, or an ionic liquid.

7. The method according to claim 1,
wherein the dissolution liquid is an acidic solution.

8. The method according to claim 1, further comprising cutting the drawn carbon fiber reinforced plastic.

9. The method according to claim 1,
wherein the heating treatment is performed using superheated steam.

10. The method according to claim 1,
wherein the resin comprises a thermosetting resin or a thermoplastic resin.

11. The method according to claim 1,
wherein the resin comprises an epoxy resin.

* * * * *